United States Patent [19]

Chapman et al.

[11] Patent Number: 4,844,958
[45] Date of Patent: Jul. 4, 1989

[54] EXTRUSION COATED CIRCULAR WOVEN FABRIC

[75] Inventors: Brenda S. Chapman, Moncks Corner; James W. Sharon, Summerville; Charles M. Shuler, North Charleston, all of S.C.

[73] Assignee: Exxon Chemical Patents Inc., Linden, N.J.

[21] Appl. No.: 26,936

[22] Filed: Mar. 16, 1987

[51] Int. Cl.$^4$ .............................................. B32B 3/00
[52] U.S. Cl. ............................. 428/36.1; 156/244.11; 156/244.13; 428/190; 428/196
[58] Field of Search .................. 428/35, 36, 190, 196; 156/244.11, 244.13, 244.22

[56] References Cited

U.S. PATENT DOCUMENTS 1,853,013  4/1932  Brady ................................. 428/190
4,557,958  12/1985  Barkis et al. ......................... 428/36

Primary Examiner—Marion C. McCamish
Attorney, Agent, or Firm—Charles E. Smith

[57] ABSTRACT

A circular woven fabric includes a woven tubular body having thermoplastic tapes secured thereto, and extrusion polymeric coatings fuse bonded to the tapes and the woven fabric. The extrusion coated circular woven fabric is particularly useful in intermediate bulk containers for carrying particulates.

17 Claims, 2 Drawing Sheets

EXTRUSION COATED CIRCULAR WOVEN FABRIC

BACKGROUND OF THE INVENTION

1. Field of the Invention

This invention relates to circular woven fabric extrusion coated with a polymeric film. In one aspect, the invention relates to circular woven intermediate bag containers having an interior or outer surface coated with a polymeric film.

2. Description of the Prior Art

Circular woven fabrics are used in a variety of applications, including intermediate bulk containers, explosive bags, and generic bags for a variety of commodities. The circular woven fabric offers the advantage over the more traditional linear fabrics in that there are no seams in the side walls. The circular woven fabric is normally manufactured in the form of a tubular body of the desired diameter. The tubular body is flattened and rolled onto a take up roll which is processed to form the bags. The bags may be formed by cutting longitudinal sections from the tubular body and either overlapping and sewing end portions together or stitching a bottom and top sections onto the tubular body forming an enclosed container.

The containers with circular woven tubular bodies, exhibit unusual strength and flexibility making them ideally suited for carrying large amounts of particulate materials and sometimes liquid materials. The intermediate bulk containers, for example, are commonly used to transport grains, minerals, polymer pellets, etc. The large diameters of such containers (e.g., from 40 to 60 inches) permit the transport of up to 3,500 pounds of material in a single container. The woven fabrics used in explosive bags are much smaller in diameter and are adapted to carry liquids.

In order to reduce or eliminate the leakage of material from the containers, it has become customary to coat the interior or exterior of the fabric with a polymeric film. One such technique involves extrusion coating the tubular fabric prior to its conversion into a bag or container. In this process, the roll stock of the woven flattened tubular body is first extrusion coated with a thin polymeric film on one side and then extrusion coated on the other side. In order to completely cover the fabric with the coating film, the extrusion coating extends a short distance, (e.g., in the order of one-half to one inch) beyond the lateral edges of the tubular body. The extrusion coatings thus are fused together in the form of a thin flap or seam extending outwardly on each side of the tubular body.

Although this process provides a complete coating on the tubular body, it has proven unsatisfactory because of the weakness in the fused flap or seam areas. The extrusion coating process inherently involves passing the coated fabric through the nip of counter rotating rolls which tends to compress the molten coating in the flap or seam areas to form thin sections. These thin sections present lines of weakness and points of failure, particularly failures resulting from high impact loads or with bag flexing during handling.

SUMMARY OF THE INVENTION

The circular fabric constructed according to the present invention includes a circular woven tubular body having longitudinally extending tapes secured to the tubular body at diametric positions and first and second extrusion polymer coatings covering the semicircular body sections between the tapes, each extrusion coating is fused to both tapes and its associated body section. A particularly advantageous feature of this construction is that the extrusion coating is fuse bonded to both the flat film and the woven body which provides circular continuity for the impermeable coating and bond strength for the junctures of the coatings to the tapes. All three of the components described above are preferably composed of a polyolefin that are compatible to insure good bonding and are compatible in terms elongation properties. The preferred polyolefins are those selected from polymers and copolymers of propylene and ethylene.

The process of the present invention involves applying a tape (or thin film) to opposite sides of the tubular woven body which can be done before or after flattening of the body: extrusion coating a thermoplastic coating unto each side of the flattened body to substantially cover said side between the tapes and edge portion of each tape. The extrusion coating provides a fused bond between the thermoplastic coating and the woven body as well as the coating and the tape.

The tape may be in the form of an adhesive tape, nonadhesive tape, or a thin film or molten thermoplastic such as hot melt adhesive. (For convenience, the term "tape" will be used to refer to the thin longitudinal strips on diametric positions on the tubular body.) In a preferred embodiment, the tape or film, as the case may be, is applied directly to the tubular body in a direction parallel to the body axis. The width of the tape is such to extend a short distance around the longitudinal edges of the flattened body. The extrusion coating of the thermoplastic is then applied to each side of the flattened body.

In an alternative embodiment, the tape on one side is positioned on the outside of the thermoplastic coating and on the other side between the thermoplastic coating and the woven fabric.

DESCRIPTION OF THE PREFERRED EMBODIMENTS

As mentioned previously, it is desirable to provide woven containers such as intermediate bulk containers with a liner or coating to prevent leakage or seepage of the contents from the container. It is preferred to provide the liner or coating on the interior of the container to facilitate the removal of its contents. Without an interior liner, particles or material could become embedded in the woven yarns of the fabric and contaminate subsequent loads.

In the manufacture of containers from flat panels which are stitched together to form box-like containers, liners can be provided by merely extrusion coating a thermoplastic onto the panels before stitching. However, in the case of circular woven seamless fabrics, extrusion coating must be applied on opposite sides of a flattened tubular body. The coating of each side by prior art process leaves opposite edge-portions exposed or lines of weakness in the coating as described above.

The present invention overcomes these shortcomings of the prior art by providing the longitudinal tapes (or film) at the exposed edge positions of the flattened tube and fuse bonded in overlapped relationship with the thermoplastic polymeric coating. The tapes with the coatings thus provides complete coverage for the tubular body and provides a strong fuse bond in the overlapped regions.

The present invention will be described with particular reference to intermediate bulk containers, but it will be understood by those skilled in the art that the invention may be equally applicable in other types of containers and tubular bodies in which thermoplastic coatings are desired.

Figure 1:
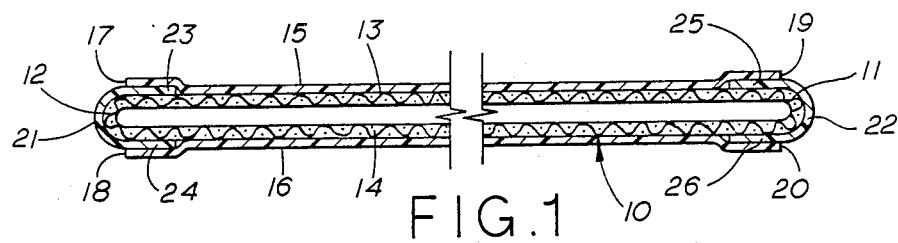
FIG. 1 is a cross sectional view of a flattened tubular continuously woven fabric extrusion coated and constructed according to the present invention.
Figure 2:
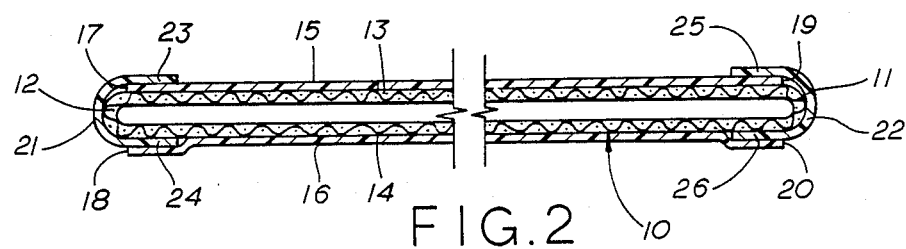
FIG. 2 is a view similar to FIG. 1 illustrating a second embodiment of the invention.

With reference to FIGS. 1 and 2, the fabric of the present invention comprises a continuous woven fabric 10 in the form of a tubular body, extrusion coatings 15 and 16 covering each side of the flattened tubular body 10, and tapes (or films) 21 and 22 extending around the edges of the flattened body and fused to the extrusion coatings 15 and 16.

The body 10 is woven by the circumferentially continuous weave process which involves the use of continuous weaving apparatus such as a Model 6/1728 Circular Weaving Machine manufactured by Lenzing USA Corporation of Austria. In this process, longitudinal or fill yarns are maintained in fixed relationship defining a cylinder having a diameter approximately the size of the tubular body to be woven. The fill yarns are woven through the longitudinal yarns in a continuous manner forming a tubular woven fabric. The fabric is continuously withdrawn from the loom, flattened, and wound on a takeup roll. The fabric is converted into a bag, such as an Intermediate Bulk Container, by cutting longitudinal sections of the tubular body and applying top and bottom closure sections.

A variety of yarns may be used as the fill and warp yarns. These include plastic materials such as polyolefins, nylons, polyesters, etc., with the polyolefins such as polymers and copolymers of ethylene and propylene being preferred. Specific preferred polyolefins include polypropylene, LDPE, HDPE, MDPE, LLDPE, and blends of these materials. For convenience, the following resin abbreviations will have the meanings indicated: PP—homopolymers of propylene; LDPE—conventional high pressure, low density polyethylene; LLDPE—linear low density polyethylene prepared by Ziegler catalyzed polymerization; HDPE—high density polyethylene; MDPE—Medium density polyethylene.

The preferred fill and warp yarns material is polypropylene having a denier of between 200 and 6,000, preferable between 500 and 2,500, with a weave density of between 4 and 25 picks per inch, typically 12 picks per inch. The yarns (particularly PP yarns) may be manufactured by the cast process where the film is cast and cooled by water quench or chill roll and thereafter slit to form the yarns of the desired width, followed by stretching, orientation, and heat set if desired. The yarns may also be monofilament film in accordance with copending U.S. application Ser. No. 754,504, filed July 12, 1985, the disclosure of which is incorporated herein by reference. The yarns then are wound on separate spindles which are capable of use directly on the circular weaving equipment.

The diameter of the tubular body 10 may vary within wide limits depending on the end use of the body. For Intermediate Bulk Containers, the tubular outside diameter will vary from 40 to 60 inches; for explosive bags the outside diameter is much smaller ranging from 3 to 12 inches.

The extrusion thermoplastic coating 15, 16 may also vary within wide limits provided the thermoplastic is compatible with the tapes 21, 22. As in the case of the woven material for the circular tubular body 10, the coating material preferably is a polyolefin and most preferably a polymer or copolymer of ethylene or propylene. The specific preferred polyolefins are LLDPE, polypropylene, polyethylene, and blends of these. In the case of linear polymers such as LLDPE and polypropylene, from 5 to 45 wt % (preferrably 10–30 wt %) of branched polymers such as conventional high pressure LDPE may be added to avoid or reduce draw resonance associated with the extrusion coating process. The polyolefins should have a melt index of 6 to 70 to insure good processability. It should also have good flexability, be fusable with the woven substrate and the tape material.

The tapes 21 and 22 are also thermoplastics, preferably polyolefins. In order to insure bondability between the tapes 21 and 22 with the thermoplastic coating 15 and 16, the tape material should be similar in composition as the coating material. Moreover the tape material should have compatible elongation properties with the thermoplastic coatings. For these reasons, the tapes are preferable polyolefins, specifically polymers and copolymers of propylene and ethylene and blends of these. The tapes may include static electricity grounding means such as electrical conductors embedded or secured in the tapes. The electrical conductors may be in the form of metal wires, carbon fibers, etc.

The width of the tapes will depend on several factors including diameter of the tubular body, economics, availability and the desired overlap. For large diameter (e.g., IBC) tubes, the tape width preferably will be sufficient to cover from 1 to 10% (preferably from 2 to 8%) of the tube; for smaller diameter tubes, the lower limit of this range may be larger to ensure sufficient overlap. The tapes, because of economics, will generally constitute less than 10% of the circumferential length of the tube.

The composition of each of the three components may also include fillers, UV stabilizers, and other resins to impart certain desired characteristics to the composition. For example, elastomer or EVA may be added to the coating composition to improve flexibility or resiliency.

Returning to FIG. 1, the flattened tubular body 10 comprises overlap layers 13 and 14 interconnected by edges 11 and 12. In the embodiment illustrated, tapes 21 and 22 extend around edges 11 and 12, respectively, and are secured to both layers 13 and 14. The tapes 21 and 22 may include adhesive for aiding in securing the tapes 15 and 16 to the body 10. The thermoplastic coating 15 covers layer 13 and has edge portions which overlap a portion of tapes 21 and 22 as at 23 and 25. Likewise, thermoplastic coating 16 covers layer 14 and has edge portions which overlap tapes 21 and 22 as at 24 and 26. The edges 17 and 19 of coating 15, and edges 18 and 20 of coating 16 do not extend beyond the lateral limits of body 10. Because the extrusion coating is applied at temperatures above the softening point of the thermoplastic employed, the coatings 15 and 16 in the overlapped areas are fuse bonded to the tapes 21 and 22. The combined overlap areas preferably should be between about 20% to 80% of the tapes.

A second embodiment illustrated in FIG. 2 is similar to FIG. 1 embodiment except the tape portions in the overlapped regions 23 and 25 with coating 15 are fuse bonded to the exterior of coating 15.

The relative dimensions of the three components (i.e., body, thermoplastic coatings, and tapes) making up the structure may vary within wide limits. The following are the preferred ranges for the thermoplastics listed.

|  | Polymer | | Thickness | |
| --- | --- | --- | --- | --- |
| Component | General | Preferred | General | Preferred |
| Woven Fabric | polyolefin | PP | 100–6000 d* | 500–2500 d |
| Extrusion Coating | polyolefin | PP and LDPE Blend | 0.25–3.0 m* | 0.5–1.25 m |
| Tape or Film | polyolefin | PP | 0.5–3.0 m | 1–2 m |

*d = denier/m = mils

Figure 3:
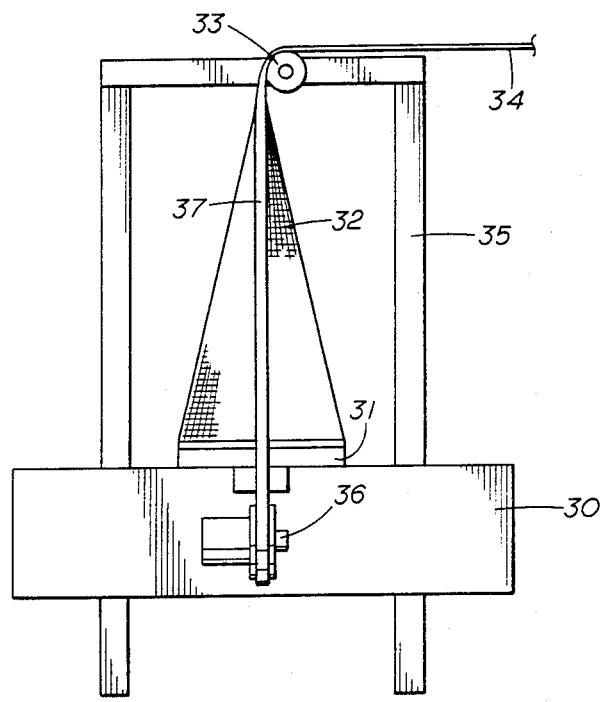
FIG. 3 is a schematic, side elevational view of a circular loom illustrating one embodiment for manufacturing the circular woven fabric useful in the present invention.

There are several processes available for manufacturing the structure of the embodiments illustrated in FIGS. 1 and 2. With respect to the FIG. 1 embodiment, the tapes 21 and 22 can be in the form of commercially available film tape, one of which is identified in the examples described below. The film tape can be applied during the manufacture of the circular woven fabric. As seen in FIG. 3 a typical circular weaving apparatus comprises a loom schematically illustrated as 30, a support structure 35 on which is mounted take away roller 33. The woven fabric 31 as it emerges from the loom 30 is withdrawn upwardly and collapsed around take-away roller 33 and forming a flattened tube as at 34 which is rolled into a takeup roll not shown. Tape dispensers, one shown at 36, are mounted on opposite sides of the loom 30 and adapted to dispense and apply a tape at diametric positions on the woven fabric 30 as it is carried up to the take-away roller 33. As shown in FIG. 3, the tape is applied in the area illustrated as 37. The collapsed or flattened body with the tapes secured to the edge portions thereof by a suitable adhesive is then transferred to the extrusion coater for the application of the extrusion coatings 15 and 16.

The present invention also contemplates the application of a molten thermoplastic as tapes over regions 37. For example, molten polymer such as polymers and copolymers of propylene or ethylene or blends thereof, may be sprayed onto the woven fabric as it emerges from the loom to provide narrow strips 37 on diametric positions of the fabric. Powder coatings, such as polypropylene, polyethylene or blends thereof, may also be applied to provide the longitudinal strips on regions 37. Foil tapes may also be applied on the regions 37.

Figure 4:
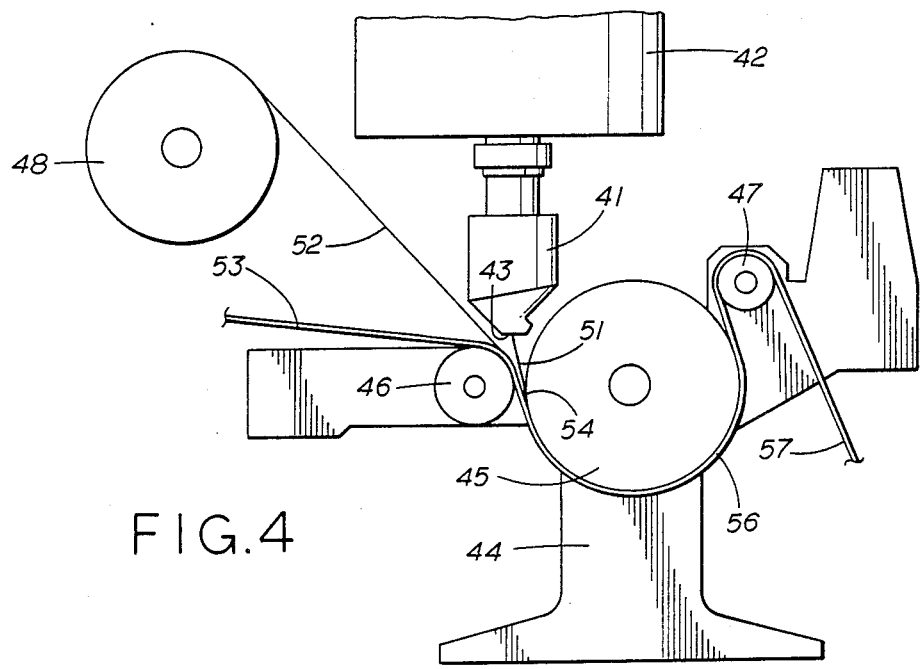
FIGS. 4 and 5 are schematic views illustrating apparatus useful in the manufacture of the present invention and carrying out the process of the present invention.

FIG. 4 illustrates an extrusion coater suitable for carrying out this process. The apparatus includes a die head 41 fed by extruder 42. The die includes an elongate die opening 43 adapted to discharge the extrudate therefrom into a roll assembly. The roll assembly is mounted on a support structure 44 and includes a chill roll 45, a backup (press) roll 46, and a takeaway roll 47. The flattened tubular fabric with the tapes secured to its edge portions is fed into the nip 54 between the chill roll 45 and press roll 46 as illustrated at 53. (Note that the film or tape roll 48 is not used in this embodiment.)

As the fabric travels along section 53 and into the nip 54 of the counter rotating rollers, the extrudate 51 is fed into the nip between the fabric 53 and the chill roll 54. The draw down and compression through the nip forms a thin coating unto the fabric 53 and is set as it passes around the periphery of the chill roll 45 as shown at 56. This bonds the coating to the fabric and is carried away around roller 47 to the takeup roll (not shown). Note that the width of the extrudate is controlled so that the coating overlaps portions of both tapes on the side being coated but does not extend beyond the lateral limits of the fabric. The takeup roll is then transferred to the feed section of the apparatus and the opposite side of the fabric coated in a similar manner.

In an alternate embodiment, the tapes 21 and 22, instead of being applied to the circular woven fabric 10 as it emerges from the loom, are applied during the extrusion coating process. In this embodiment a tape roll 48 is adapted to the assembly shown in FIG. 4 to feed the tape 21 (interval 52 on FIG. 4) into the nip 54 between the fabric 53 and the extrudate 51. The tape 21 is carefully guided into the nip 54 so that a portion is overlapped with the fabric 53 and a portion extends laterally outwardly therefrom. Likewise, tape 22 is applied to the opposite edge of the fabric 53. At the conclusion of this operation, the overlapped portion of each tape 21 and 22 is fuse bonded to the extrusion coating which in turn is fuse bonded to the fabric substrate, with a longitudinal portion of the tape extending outwardly from the fabric body.

The roll is transferred to the feed section of the apparatus for coating the second side of the fabric 53. The laterally extending portion of each tape 21 and 22 is then wrapped around the edge of the body 53. The operation is repeated (without the use of tape roll 48) thereby securing the tapes 21 and 22 to the second extrusion coating as it is applied. The second coating covers the exposed portion of the fabric and longitudinal portions of each tape. As in previous operations, the thermoplastic coatings do not extend beyond the lateral limits of the fabric.

Figure 5:
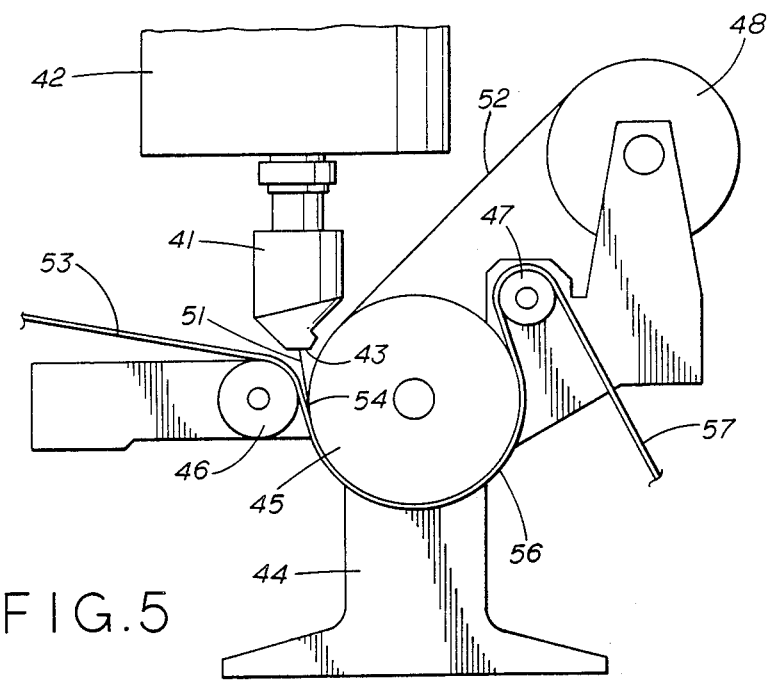

The structure of FIG. 2 may be fabricated using the apparatus of FIG. 5. The operation is similar, except that the tapes (e.g., 21) are fed into the nip 54 between the chill roll 45 and the extrudate 51. This results in tapes 21 and 22 overlapping coating 15 in regions 23 and 25. In the second pass for applying coating 16, which occurs following wrapping the tapes around the fabric edges, the extrusion coating 16 is applied to the fabric and the outer surface of the overlap tape portions in regions 24 and 26.

In the embodiment where the tapes 21 and 22 are applied prior to the extrusion coating step, the tape may include adhesive for improving the bond between the tape and the woven substrate. In other applications, it may be desirable that no such adhesive be applied since it has been found that the fuse bond between the tape and the thermoplastic coating may be adversely affected by the presence of antiblocks or materials used with adhesive backed tapes to aid in unwinding the tapes.

The extrusion coated tubular bodies then are fabricated into bags or containers of the desired size. In the case of Intermediate Bulk Containers, the tubular body is cut at intervals normally in the range of 3 feet to 12 feet and bottom and top closure sections, also extrusion coated, are stitched to the open ends of the tubular body.

EXAMPLES

An Intermediate Bulk Container having the cross sectional construction of FIG. 1 and the following dimensions and composition was prepared.

|  | Composition | Dimensions |
|---|---|---|
| Tubular Body: | IBC Circular Woven PP Fabric[1] | 44" long, 44" diameter, 1900 denier (yarns) 6.5 oz/yd[2] (fabric) |
| Tape: | PP[2] with Adhesive | 4" wide, 44" long 1.5 mil thickness |
| Coating: | 80 wt % Extrusion Grade PP[3] | 68" wide, 44" long, |
|  | 20 wt % Extrusion Grade LDPE[3] with UV Stabilizer | 1 mil thick (1½" overlap of each tape) |

[1]Marketed by EXXON CHEMICAL COMPANY
[2]Marketed by 3-M Company
[3]Marketed by EXXON CHEMICAL COMPANY As the circular woven tubular body emerged from the loom, the tape was applied to diametric opposite sides as illustrated in FIG. 3. The flattened tubular body with the tapes wrapped around its edges were extrusion coated using an extrusion coater manufactured by Lenzing USA Corporation of Austria. The extrusion coating was carried out as follows: extrusion temperature 600° F.; chill roll temperature 90° F.; and line speed 150 FPM.

The tubular body was then cut and the bottoms and tops, and loops were stitched thereto forming an intermediate bulk container. The bag then was filled with 3,000 lbs. of particulate material and hoisted four (4) feet above the ground. Quick release was activated on the hoist and the bag allowed to fall to the floor. The fabric showed no failures of the bag.

From the above tests, it can be seen that the extrusion coating of the tape or film provided a secure bond which is capable of withstanding severe shocks.

What is claimed:

1. A circular woven fabric comprising
   (a) a circular woven tubular body of thermoplastic continuous warp yarns and fill yarns;
   (b) first and second longitudinally extending tape sections adhered to the tubular body at substantially diametric positions thereon, defining two substantially semicircular body sections therebetween; and
   (c) a thermoplastic coating extrusion coated onto each of the semicircular body sections and an overlapping edge portion of each tape section bordering such body section whereby each thermoplastic coating is fuse bonded to the body section and each bordering tape section.

2. The circular woven fabric of claim 1 wherein the yarns, and the extrusion coating are selected from thermoplastic polyolefins, the polyolefin of the coating being fuse bondable with the yarns and the tapes.

3. The circular woven fabric of claim 2 wherein the polyolefins are selected from polymers and copolymers of ethylene and propylene and blends thereof.

4. The circular woven fabric of claim 3 wherein the coating is a blend of polypropylene and linear low density polyethylene, wherein polypropylene constitutes the major weight percent of the blend.

5. The fabric of claim 1 wherein the tape sections are polypropylene and are adhered by adhesive to the tubular body.

6. The fabric of claim 2 wherein the tape sections are thermoplastic film, fuse bonded to the tubular body.

7. The fabric of claim 1 wherein the tape sections cover less than 10% of the tube and wherein each of the overlaps between each of the tape sections and the coatings comprises from 20 to 90% of the tape section.

8. The fabric of claim 1 wherein the tubular body has an OD of 40 inches or greater.

9. The fabric of claim 1 wherein the width of each coating is less than one-half the circumference of the body.

10. The fabric of claim 1 wherein the extrusion coating is between 0.5 to 3 mils thick.

11. The fabric of claim 1 wherein the tape section in the overlapped areas are between the tubular body and the coatings.

12. The fabric of claim 1 wherein the tape section in the overlapped regions on one side of the body are between the woven fabric and the coating on that side and the coating in the overlapped regions on the other side is between the fabric and the tape section.

13. The fabric of claim 11 wherein the tape section are fuse bonded to both the fabric body and the coatings.

14. A intermediate bulk container comprising the fabric of claim 1 and a bottom member stitched to one end of the tubular body, and lifting loops stitched to the other end of the tubular body.

15. A process for manufacturing an extrusion coated circular fabric comprising:
   (a) circular weaving a seamless tubular body;
   (b) applying a pair of longitudinally extending flat tape or film sections to opposite sides of the tubular body;
   (c) flattening the tubular body to form overlapped body layers, each tape or film section extending around its associated edge of the flattened body and onto each of the overlapped body layers; and
   (d) extrusion coating a thermoplastic coating onto each of the overlapped body layers to substantially cover each of said overlapped layers between the tape sections and an edge portion of each tape section, whereby each of said coatings is fuse bonded to said woven fabric and each tape section.

16. A process for manufacturing an extrusion coated circular fabric comprising:
   (a) circular weaving a seamless tubular body;
   (b) flattening the tubular body to form overlapped fabric first and second layers;
   (c) applying a thin tape or film section along longitudinal edges of the flattened tubular body to form longitudinal overlapped tape portions on the first layer and laterally outwardly extending tape portions;
   (d) extrusion coating a thermoplastic coating onto said first layer to cover said layer between the tapes and a portion of the overlapped portion of each tape section;
   (e) folding the outwardly extending portion of each tape section around its associated edge to overlap the second layer; and
   (f) extrusion coating a thermoplastic coating onto the second layer to substantially cover said second layer between the tape sections and to cover a portion of the overlapped portions of said tape sections.

17. A process for manufacturing an extrusion coated circular fabric comprising:
    (a) circular weaving a seamless tubular body;
    (b) flattening the tubular body to form overlapped fabric first and second layers;
    (c) extrusion coating a thin tape or film onto edge portions of the flattened fabric while applying a tape section to an outer surface of each of the coatings to form an extrusion coated layer on said fabric having tape sections fused to edge portions thereof, said tape sections extending beyond the lateral dimensions of the fabric and coatings:
    (d) folding the outwardly extending portion of each tape around its associated edge to overlap the second layer; and
    (e) extrusion coating a thermoplastic coating onto the second layer to substantially cover said second layer between the tape sections and a portion of the overlapped portions of said tape sections.

* * * * *